(12) United States Patent
Batshon et al.

(10) Patent No.: US 9,929,813 B1
(45) Date of Patent: Mar. 27, 2018

(54) OPTICAL COMMUNICATION SYSTEM AND METHOD USING A NONLINEAR REVERSIBLE CODE FOR PROBABLISTIC CONSTELLATION SHAPING

(71) Applicant: TYCO ELECTRONICS SUBSEA COMMUNICATIONS LLC, Eatontown, NJ (US)

(72) Inventors: Hussam G. Batshon, Neptune, NJ (US); Maxim A. Bolshtyansky, Millstone, NJ (US)

(73) Assignee: TYCO ELECTRONICS SUBSEA COMMUNICATIONS LLC, Eatontown, NJ (US)

( * ) Notice: Subject to any disclaimer, the term of this patent is extended or adjusted under 35 U.S.C. 154(b) by 0 days.

(21) Appl. No.: 15/450,635

(22) Filed: Mar. 6, 2017

(51) Int. Cl.
*H04B 10/00* (2013.01)
*H04B 10/516* (2013.01)

(52) U.S. Cl.
CPC .................................. *H04B 10/516* (2013.01)

(58) Field of Classification Search
CPC ... H04L 1/0071; H04L 27/2613; H04L 27/34; H04L 1/0041; H04L 1/0057; H04L 5/0053; H03M 13/1102; H03M 13/152; H03M 13/2906
USPC ......................................................... 398/183
See application file for complete search history.

(56) References Cited

U.S. PATENT DOCUMENTS

| | | | |
|---|---|---|---|
| 9,337,935 B2 | 5/2016 | Batshon et al. | |
| 9,397,786 B2 | 7/2016 | Zhang et al. | |
| 9,407,398 B2 | 8/2016 | Batshon et al. | |
| 2007/0042372 A1* | 2/2007 | Arita | B82Y 10/00 435/6.12 |
| 2011/0305300 A1* | 12/2011 | Ko | H03M 13/1165 375/298 |
| 2016/0197752 A1* | 7/2016 | Schmalen | H04L 25/0228 375/298 |
| 2016/0254939 A1* | 9/2016 | Miyazaki | H04L 27/3818 375/341 |
| 2016/0366006 A1* | 12/2016 | Hong | H04L 5/0007 |

OTHER PUBLICATIONS

Zhang et al; "DP-16QAM Based Coded Modulation Transmission in C+L Band System at Transoceanic Distance"; OFC 2016; OSA 2016.

* cited by examiner

*Primary Examiner* — Don N Vo

(57) ABSTRACT

A system and method involving using a nonlinear reversible code for probabilistic constellation shaping. A nonlinear reversible code encoder receives information bits and applies a nonlinear reversible code to the information bits to provide encoded bits. A mapper maps the encoded bits to successive amplitude and phase-shift keying (APSK) symbols. Each of the APSK symbols has an APSK modulation format with an associated constellation and the mapper maps each of the symbols to an associated constellation location of the constellation in response to one or more associated ones of the encoded bits.

19 Claims, 4 Drawing Sheets

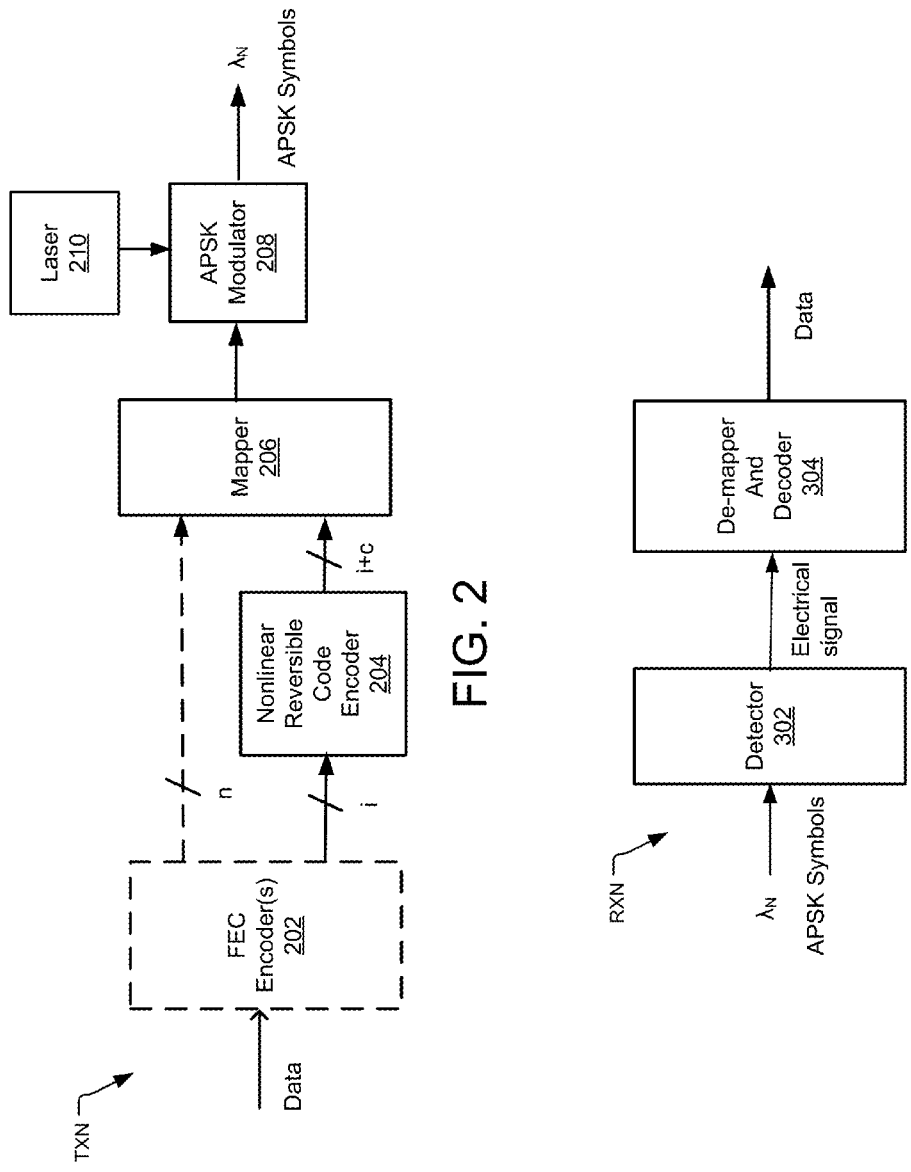

| S1 | S2 | S3 | S4 | S5 | S6 |
|---|---|---|---|---|---|
| $X_1X_2X_3X_4X_5X_6$ | $X_7X_8X_9X_{10}X_{11}X_{12}$ | $X_{13}X_{14}X_{15}X_{16}X_{17}X_{18}$ | $X_{19}X_{20}X_{21}X_{22}X_{23}X_{24}$ | $X_{25}X_{26}X_{27}X_{28}X_{29}X_{30}$ | $X_{31}X_{32}X_{33}X_{34}X_{35}X_{36}$ |

US 9,929,813 B1

OPTICAL COMMUNICATION SYSTEM AND METHOD USING A NONLINEAR REVERSIBLE CODE FOR PROBABLISTIC CONSTELLATION SHAPING

TECHNICAL FIELD

The present disclosure relates to optical signal data detection and more particularly, to an optical communication system and method using a nonlinear reversible code for probabilistic constellation shaping.

BACKGROUND

In wavelength division multiplexed (WDM) optical communication systems, a number of different optical carrier wavelengths are separately modulated with data to produce modulated optical signals. The modulated optical signals are combined into an aggregate signal and transmitted over an optical transmission path to a receiver. The receiver detects and demodulates the data.

One type of modulation that may be used in optical communication systems is phase-shift keying (PSK). According to different variations of PSK, data is transmitted by modulating the phase of an optical wavelength such that the phase or phase transition of the optical wavelength forms a symbol representing one or more bits. Amplitude-shift keying (ASK) is another type of modulation format wherein data is transmitted by modulating the amplitude of an optical signal such that the amplitude or amplitude transition of the signal forms a symbol representing one or more bits. Amplitude-shift keying and phase-shift keying may be combined to provide an amplitude and phase-shift keying (APSK) format. In an APSK signal, information is modulated using a combination of phase-shift keying and amplitude-shift keying, for example, to encode multiple bits per symbol.

APSK formats may have a square or circular signal constellation. A signal constellation is a predetermined plan or map indicating how information bits correspond to associated symbols modulated on an optical signal. The constellation is typically represented as a two-dimensional scatter diagram in the complex plan. The real and imaginary axes of the complex plane often called the in-phase, or I-axis, and the quadrature, or Q-axis, respectively. For a particular modulation format, the constellation identifies the exact information bits that correspond to each symbol (having real and imaginary values) modulated on an optical wavelength. As used herein a "square constellation" is a constellation wherein the two-dimensional scatter diagram in the complex plane forming the constellation has a square shape with constellation points arranged in a single square or multiple squares having a common center. As used herein a "circular constellation" is a constellation wherein the two-dimensional scatter diagram in the complex plane forming the constellation has a circular shape with constellation points arranged in a single ring or concentric rings.

One type of APSK format with a square signal constellation is a quadrature amplitude modulation (QAM) format. Although a QAM format may be broadly viewed as a format wherein data is represented using PSK with or without ASK, QAM formats using both PSK and ASK and having a square constellation are common. For example, a conventional 16-QAM modulation format having a square constellation uses phase shift keying and amplitude shift keying to represent four bits per symbol.

APSK formats with circular signal constellations may be described as M-APSK formats where $M=2^m$, and each symbol represents m bits. For example, a 16-APSK modulation format may be used to encode 4 bits per symbol and 64-APSK may be used to encode 6 bits per symbol.

Coded modulation has been used with APSK formats to compensate for signal degradation contributed by different sources when an optical signal is transmitted over long distances. Coded modulation involves use of a forward error correction (FEC) code. FEC is essentially the incorporation of a suitable code into a data stream at the transmitter. The transmitter receives a data stream and encodes the data stream using an FEC encoder that introduces some redundancy in the binary information sequence of the data stream. The receiver receives the encoded data and runs it through an FEC decoder to detect and correct errors. Examples of coded modulation QAM schemes are described in U.S. Pat. No. 9,407,398 and U.S. Pat. No. 9,397,786, the teachings of which are hereby incorporated herein by reference.

Constellation shaping is another technique used to improve receiver sensitivity by providing a signal-to-noise (SNR) gain in optical systems. In general, constellation shaping involves transmitting lower energy signals more often than higher energy signals. Geometric constellation shaping and probabilistic constellation shaping are two known techniques. In geometric shaping, the constellation points are not uniformly distributed but are equi-probable. In probabilistic constellation shaping, the constellation points are provided on a uniform grid but with constellation points having different probabilities depending on the constellation point energy.

BRIEF DESCRIPTION OF THE DRAWINGS

Reference should be made to the following detailed description which should be read in conjunction with the following figures, wherein like numerals represent like parts:

FIG. 2 is a block diagram of one exemplary embodiment of a transmitter consistent with the present disclosure.

FIG. 3 is a block diagram of one exemplary embodiment of a receiver consistent with the present disclosure.

DETAILED DESCRIPTION

In general, a system and method consistent with the present disclosure involves use of a nonlinear reversible code to perform probabilistic constellation shaping with APSK modulation formats. The nonlinear reversible code is provided in response to one or more information bits, to provide encoded bits that are mapped in groups to successive APSK symbols. The symbols are mapped to associated constellation locations in response to one or more of the encoded bits. The encoded bits provided according to the non-linear reversible code thus control the constellation location of the APSK symbols to provide constellation shaping. In general, probabilistic constellation shaping consistent with the present disclosure provides improved receiver sensitivity compared to formats without constellation shaping, and may be combined with coded-modulation.

The term "nonlinear" when used herein in reference to a code refers to a code where a linear combination, e.g. modulo addition or any other linear geometry space transformation, of a code word is not also a code word. The term "reversible" when used herein in reference to a code means there is a one-to-one correspondence between the input and the output code word. A nonlinear reversible code is thus distinct from a linear code. As is known, linear codes are codes where any linear combination, e.g. modulo addition or any other linear geometry space transformation, of a code word is also a code word. Parity codes, linear block codes and convolutional codes are examples of linear codes. Linear codes are usually reversible by design. Nonlinear codes are not necessarily reversible. Systems and methods consistent with the present disclosure use nonlinear reversible codes for constellation shaping.

Figure 1:
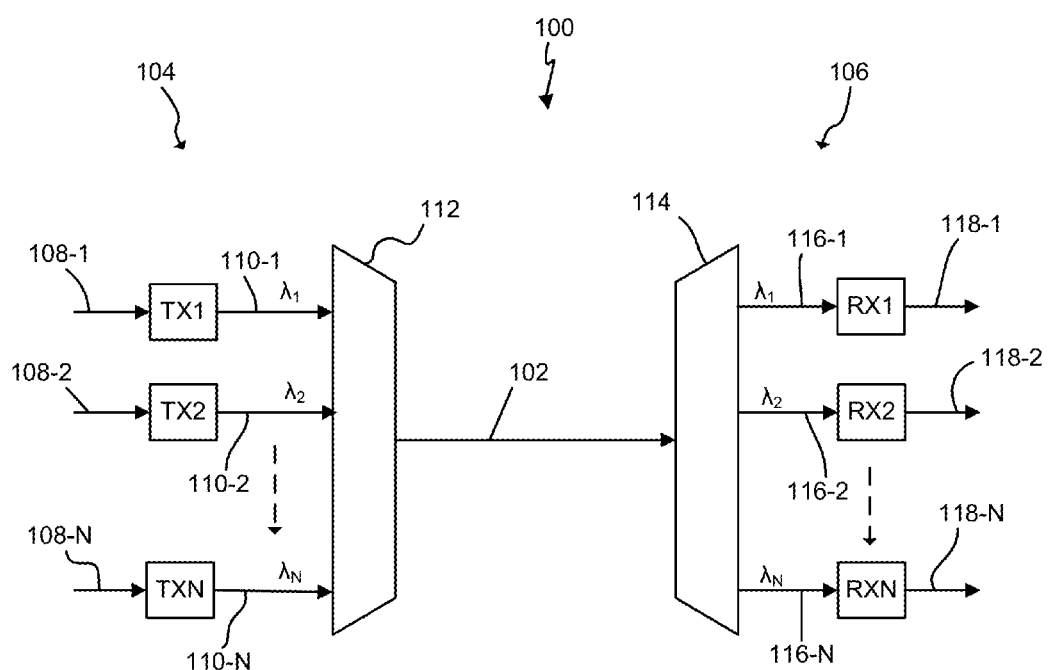
FIG. 1 is a block diagram of one exemplary embodiment of a system consistent with the present disclosure.

FIG. 1 is a simplified block diagram of one exemplary embodiment of a WDM transmission system 100 consistent with the present disclosure. The transmission system serves to transmit a plurality of optical channels over an optical information path 102 from a transmitting terminal 104 to one or more remotely located receiving terminals 106. The exemplary system 100 may be a long-haul submarine system configured for transmitting the channels from a transmitter to a receiver at a distance of 5,000 km, or more. Although exemplary embodiments are described in the context of an optical system and are useful in connection with a long-haul WDM optical system, the broad concepts discussed herein may be implemented in other communication systems transmitting and receiving other types of signals.

Those skilled in the art will recognize that the system 100 has been depicted as a highly simplified point-to-point system for ease of explanation. For example, the transmitting terminal 104 and receiving terminal 106 may, of course, both be configured as transceivers, whereby each may be configured to perform both transmitting and receiving functions. For ease of explanation, however, the terminals are depicted and described herein with respect to only a transmitting or receiving function. It is to be understood that a system and method consistent with the disclosure may be incorporated into a wide variety of network components and configurations. The illustrated exemplary embodiments herein are provided only by way of explanation, not of limitation.

In the illustrated exemplary embodiment, each of a plurality of transmitters TX1, TX2 . . . TXN receives a data signal on an associated input port 108-1, 108-2 . . . 108-N, and transmits the data signal on an associated wavelength $\lambda_1, \lambda_2 \ldots \lambda_N$. The transmitters TX1, TX2 . . . TXN may be configured to modulate data on its associated wavelength $\lambda_1, \lambda_2 \ldots \lambda_N$ using an associated spectral efficiency in a variable spectral efficiency configuration consistent with the present disclosure. The transmitters TX1, TX2 . . . TXN, of course, are shown in highly simplified form for ease of explanation. Those skilled in the art will recognize that each transmitter TX1, TX2 . . . TXN may include electrical and optical components configured for transmitting the data signal at its associated wavelength $\lambda_1, \lambda_2 \ldots \lambda_N$ with a desired amplitude and modulation.

The transmitted wavelengths $\lambda_1, \lambda_2 \ldots \lambda_N$ or channels are respectively carried on a plurality of paths 110-1, 110-2 . . . 110-N. The data channels are combined into an aggregate signal on optical path 102 by a multiplexer or combiner 112. The optical information path 102 may include optical fiber waveguides, optical amplifiers, optical filters, dispersion compensating modules, and other active and passive components.

The aggregate signal may be received at one or more remote receiving terminals 106. A demultiplexer 114 separates the transmitted channels at wavelengths $\lambda_1, \lambda_2 \ldots \lambda_N$ onto associated paths 116-1, 116-2 . . . 116-N coupled to associated receivers RX1, RX2 . . . RXN. One or more of the receivers RX1, RX2 . . . RXN may be configured to demodulate the transmitted signal using iterative decoding and may provide an associated output data signal on an associated output path 118-1, 118-2, 118-3, 118-N.

In general, in a system or method consistent with the present disclosure, one or more of the transmitters TX1, TX2 . . . TXN may be configured to use a nonlinear reversible code to perform probabilistic constellation shaping use a coded modulation scheme with APSK modulation formats. FIG. 2 is a simplified block diagram of one exemplary transmitter TXN consistent with the present disclosure. The illustrated exemplary transmitter TXN includes an optional FEC encoder(s) 202, a nonlinear reversible code encoder 204, a mapper 206, and an APSK modulator 208 for modulating the output of a continuous-wave laser 210 for providing a modulated output on a carrier wavelength $\lambda_N$. In the illustrated embodiment, the transmitter TXN is shown as transmitting a single polarization for ease of explanation. Those of ordinary skill in the art will recognize that a transmitter consistent with the present disclosure may be configured for transmitting a polarization multiplexed (POLMUX) signal by duplicating the illustrated configuration for transmitting data on each polarization.

In the illustrated exemplary embodiment, a data stream including i information bits is coupled to the nonlinear reversible code encoder 204. The nonlinear reversible code encoder 204 is configured to receive the i information bits and apply a nonlinear reversible code in response to the i information bits to provide an encoded output comprising i+c bits. For example, each of the possible bit sequences for the i information bits may be associated with a specific predetermined code word in the nonlinear reversible code encoder 204. In response to a specific sequence of i information bits, the nonlinear reversible code encoder 204 may be configured to provide the specific predetermined code word associated with the specific sequence of i information bits as the encoded output.

The nonlinear reversible code encoder may take any configuration that provides a specific predetermined encoded output in response to the i information bits. For example, the encoded output may be provided using a lookup table or application specific integrated circuit (ASIC) in the nonlinear reversible code encoder 204. Upon receipt of a specific sequence of i information bits, a processor in the nonlinear reversible code encoder 204 may provide the specific predetermined code word stored in the lookup table as being associated with the specific sequence of i bits as the encoded output, or an ASIC may be configured to provide the specific predetermined code word as the encoded output in response to the specific sequence of i bits.

In general, the nonlinear reversible code applied by the nonlinear reversible code encoder 204 is used to control the probability of the occurrence of 1 and 0 bit values for constellation point bit representations. For example, each bit of the i information bits at the input to the nonlinear reversible code encoder may have a probability of having a digital 1 value (P1) that is equal to a probability of having a digital 0 value (P0), i.e. P1=P0=1/2. The nonlinear reversible code encoder receives the i information bits, and in response thereto, provides a predetermined associated encoded output having i+c bits with a P1 that is not equal to P0. Preferably, the encoded output has P0>P1.

The encoded output of the nonlinear reversible code encoder is coupled to the mapper 206. In some embodiments, a second number, n, of information bits are also coupled to the mapper 210 without encoding by the nonlinear reversible code encoder 204. The mapper 210 may be configured to map the i+c bits of the encoded output of the nonlinear reversible code encoder, and optionally the n additional information bits, either in groups of bits to associated symbols using a mapping scheme, such as a Gray map. In an embodiment using an M-APSK modulation format, for example, the mapper may group the bits in groups of $\log_2(M)$ and convert the bits of each group into symbol indices for the modulator. As used herein a "Gray map" or "Gray mapping" refers to the known Gray mapping scheme whereby a code is assigned to each of a contiguous set of bits such that adjacent code words differ by one bit and does not involve adding additional bits to a data stream (i.e. Gray mapping has no overhead).

Advantageously, the mapper maps each of the symbols to an associated constellation location, e.g. an associated quadrant, or ring of the constellation, in response to one or more of the i+c bits of the encoded output of the nonlinear reversible code encoder 204. For example, the encoded output of the nonlinear reversible code encoder 204 may be selected so that the mapper maps symbols to one or more specific rings of a circular constellation with higher probability than other rings of a circular constellation. The nonlinear reversible code encoder thus provides an encoded output that performs probabilistic shaping of the constellation associated with the selected modulation format.

The output of the mapper 206 may be modulated onto an optical carrier wavelength $\lambda_N$ of the continuous-wave laser 210 using the known APSK modulator 208. The APSK modulator 208 may be configured to map the output of the mapper 206 to APSK symbols having a square constellation, e.g. using a QAM modulation format, or a circular constellation, e.g. using an M-APSK modulation format. Preferably, however, the modulation format used by the APSK modulator 208 is an M-APSK modulation format having a circular constellation.

Circular constellation M-APSK formats provide high spectral efficiency and with a low signal peak-to-average power ratio (PAPR), e.g. compared to QAM modulation formats having a square constellation. A signal with a low PAPR is more robust against nonlinear impairments associated with the transmission path. In addition, to approach channel capacity over a power-limited AWGN channel, the input signal should follow a Gaussian distribution. A M-APSK modulation format with a circular constellation has a point distribution that is much closer to a Gaussian distribution, e.g. compared to QAM modulation formats having a square constellation, and allows a closer realization of channel capacity. Also, Gray mapping of an M-APSK modulation with a circular constellation may use the convention that least significant bits (LSBs) select the ring of the constellation to which the bits are mapped. With this convention, the encoded output of the nonlinear reversible code encoder 204 may be used to control the probability that groups of bits are mapped to specific rings of the constellation.

The optional FEC encoder(s) 202 may each be configured to encode a data stream received thereby with one or more FEC codes and provide one or more output data streams encoded with the FEC code(s). In a known manner, the FEC codes may be used to further control the probabilities of constellation locations, maintain features such as an increased Euclidean distance between constellation points, allow for iterative decoding, etc., as described for example in U.S. Pat. No. 9,407,398 and U.S. Pat. No. 9,397,786, the teachings of which are hereby incorporated herein by reference Numerous FEC codes are known, each with different properties related to how the codes are generated and consequently how they perform. Examples of known error correcting codes include the linear and cyclic Hamming codes, the cyclic Bose-Chaudhuri-Hocquenghem (BCH) codes, the convolutional (Viterbi) codes, the cyclic Golay and Fire codes, Turbo convolutional and product codes (TCC, TPC), and low density parity check codes (LDPC). A parity check code such as a single parity check (SPC) code is another well-known FEC code. Hardware and software configurations for implementing various error correcting codes in the FEC encoders 202 and corresponding decoder(s) 304 (FIG. 3) are known to those of ordinary skill in the art.

In a WDM system 100, the optical output of the modulator 208 may be coupled to the multiplexer 112 and multiplexed with optical outputs of other transmitters into an aggregate signal for transmission over the optical information channel 102. The demultiplexer 114 at the receiving terminal may demultiplex the aggregate signal and the demultiplexed optical signals maybe coupled to associated receivers. The receivers are configured for demodulating and decoding the optical signals to reproduce the associated data streams 118-N.

FIG. 3 is a simplified block diagram of one exemplary receiver RXN consistent with the present disclosure. The illustrated exemplary embodiment RXN includes a detector 302 a demapper and decoder 304. In the illustrated embodiment, the receiver is shown as receiving a single polarization for ease of explanation. Those of ordinary skill in the art will recognize that a receiver consistent with the present disclosure may be configured for receiving a polarization multiplexed signal (POLMUX) by duplicating the illustrated configuration for receiving data modulated on each polarization.

The detector 302 may be configured to receive the optical signal modulated on the carrier wavelength $\lambda_N$ and to convert the optical signal into a digital electrical signal. In one embodiment, for example, the detector 302 may be provided in a known coherent receiver configuration, e.g. a polarization diversity coherent receiver, with a digital signal processing (DSP) circuit. The DSP circuit may process the output of the coherent receiver to provide a digital electrical output signal to the demapper and decoder 304 and that reproduces the output signal of the mapper 206 in the transmitter.

The output of the detector is coupled to the de-mapper and decoder 304. The de-mapper and decoder 304 receives the output of the detector 302 and uses nonlinear reversible code applied by the nonlinear reversible decoder 204 and any FEC code(s) applied by FEC encoder(s) 202 in the transmitter to reverse the mapping of data to the modulation format that occurred at the transmitter to provide an output data stream that reproduces the input data to the transmitter TXN.

The de-mapper and decoder 304 may be provided in a variety of configurations. In one embodiment, for example, the de-mapper and decoder 304 may be configured as a known maximum a posteriori (MAP) detector. To reverse the nonlinear reversible code applied by the nonlinear reversible code encoder 204 in the transmitter, the demapper and decoder 304 may, for example, use a lookup table that is the reverse of a lookup table used by the nonlinear reversible code encoder 204, or an ASIC that that reverses the code applied by the nonlinear reversible code encoder 204. De-mapping and decoding in the demapper and decoder 304 may be performed iteratively in response to a priori log likelihood ratio (LLR) feedback from the output of the receiver RXN.

A system and method consistent with the present disclosure may be configured to use any APSK modulation format. Also, a variety of combinations of i information bits provided to the nonlinear reversible code encoder with, or without, n information bits provided directly to the mapper without encoding by the nonlinear reversible code encoder are possible. In one example, a 64-APSK modulation format may be used with Gray mapping that uses the convention that the LSBs of the bit representations for each constellation point select the ring of the constellation in which the constellation point is placed. In this configuration, the mapper 206 maps the bits to $(n+i+c)/(\log_e (M))$ associated M-APSK symbols. For example, if n=0, i=9 and c=3, the 12 bit encoded output of the nonlinear reversible encoder would be mapped to $(0+9+3)/6=2$ 64-APSK symbols, or if n=30, i=3 and c=3, the 6 bit encoded output of the nonlinear reversible encoder and the 30 additional information bits would be mapped to $(30+3+3)/6=6$ 64-APSK symbols.

Figures 4, 5:
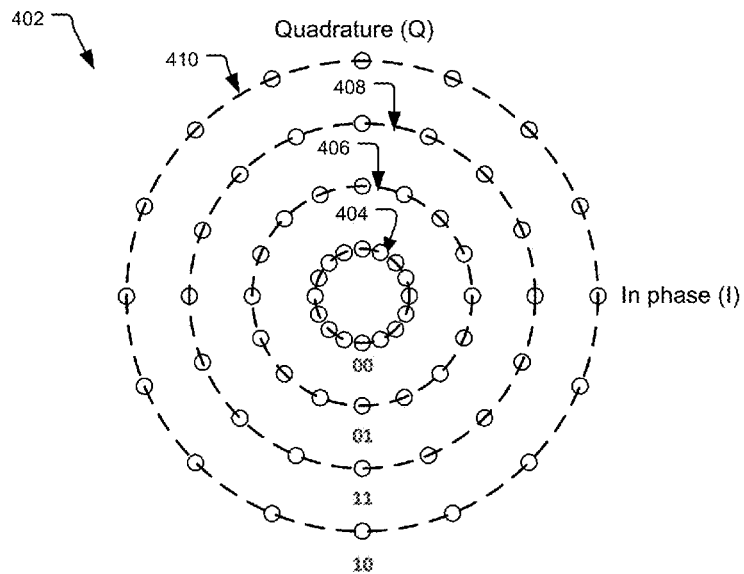
FIG. 4 is a constellation diagram illustrating a 64-APSK modulation format with Gray mapping consistent with the present disclosure.
FIG. 5 diagrammatically illustrates a modulated output of an exemplary transmitter consistent with the present disclosure.

FIG. 4, for example, is a constellation diagram 402 of a 64-APSK signal including four concentric rings 404, 406, 408, 410. Adjacent each ring 404, 406, 408, 410 is shown the LSBs of the bit representations for each constellation point in the ring 404, 406, 408, 410. As shown, the LSBs for all the constellation points on the inner most ring 404 are 00, the LSBs for all the constellation points on the second ring 406 are 01, the LSBs for all the constellation points on the third ring 408 are 11 and the LSBs for all the constellation points on the outermost ring 410 are 10.

The constellation points in each ring 404, 406, 408, 410 have the same energy, with increasing energy from the innermost ring 404 to the outermost ring 410. Since the constellation points on the same ring 404, 406, 408, 410 of the constellation have the same energy, the probability of the same-energy constellation points may be controlled by controlling the probability of the occurrence of a point being in specific rings 404, 406, 408, 410. Probabilistic constellation shaping may thus be achieved in this example by controlling the probabilities of 0's and 1's in the LSBs for the constellation point bit representations using the nonlinear reversible code.

For example, with reference to FIG. 4, by controlling the first LSB to be a 0, either of the two inner rings 404, 406 are selected. If this bit location has a higher probability of being a 0 then the average symbol energy of the constellation diagram is reduced compared to a configuration wherein this bit location has same probability of being a 1 as a 0. Also, by controlling the LSBs to be equal to each other, either the first ring 404 or the third ring 408 are selected. Thus by controlling the probability of 0's and the relationship between the 2 LSBs that select the ring in the illustrated embodiment, any probability distribution over the rings may be achieved assuming a large enough dimensionality. Advantageously, when using an M-APSK modulation format, the required dimensionality to achieve a desired probability distribution is smaller than that of an APSK format with a square constellation.

In the illustrated example, the probability of the bit values and the relationship between the two LSBs that select the ring of the constellation may be controlled in a variety of ways using the nonlinear reversible code imparted by the nonlinear reversible code encoder 202. FIG. 5, for example, diagrammatically illustrates a modulated output consistent with the present disclosure wherein bits x1-x36 are mapped to a block of six associated 64-APSK symbols. In this example, and with reference to FIG. 2, the number, i, of information bits provided to the reversible code encoder may be 3, and the number, n, of additional bits may be 30.

The nonlinear reversible code encoder may apply a 3/6 nonlinear reversible code by receiving the 3 information bits with input probabilities $P0=P1=1/2$ and output one of 8 possible code words of six bits each (i+c=6) to provide an encoded output according to table 1 below. The output probabilities of the code words of an encoded output according to table 1 are $P0=5/6$ and $P1=1/6$.

TABLE 1

| INPUT | $X_5$ | $X_{11}$ | $X_{17}$ | $X_{23}$ | $X_{29}$ | $X_{35}$ |
|---|---|---|---|---|---|---|
| 000 | 0 | 0 | 0 | 0 | 0 | 0 |
| 001 | 1 | 0 | 0 | 0 | 0 | 0 |
| 010 | 0 | 1 | 0 | 0 | 0 | 0 |
| 011 | 0 | 0 | 1 | 0 | 0 | 0 |
| 100 | 0 | 0 | 0 | 1 | 0 | 0 |
| 101 | 0 | 0 | 0 | 0 | 1 | 0 |
| 110 | 0 | 0 | 0 | 0 | 0 | 1 |
| 111 | 1 | 1 | 0 | 0 | 0 | 0 |

The code word generated by the nonlinear reversible code encoder may be used to encode the first LSB over the six symbols shown in FIG. 5, while the n additional information bits are mapped to the other bit locations in the six symbols. In particular, the code word generated nonlinear reversible code encoder may be mapped to bit locations x5, x11, x17, x23, x29 and 35 (the first LSB for each of the six symbol bit representations shown underlined in FIG. 5), and the n additional information bits are mapped to bit locations, x1-x4, x6, x7-10, x12, x13-16, x18, x19-x22, x24, x25-x28, x30, x31-x34 and x36.

Controlling the probabilities of the first LSB in the bit representations of each of the six symbols using the nonlinear reversible code increases the probability that symbols are mapped to lower energy constellation points. Although the illustrated embodiment involves use of the nonlinear reversible code to control the first LSB in the bit representation of the symbols, the nonlinear reversible code may be used to control any bit or combination of bits in any symbol or combination of symbols. For example, the nonlinear reversible code may be used to control both the LSBs to control placement of points in a specific ring, or to control the second LSB.

Probabilistic shaping consistent with the present disclosure may also be used to increase the Euclidean distance between constellation points. In general, increasing the Euclidean distance between constellation points is useful in both 2-dimensional domain and the multi-dimensional domain. In multi-dimensional domain, the larger the Euclidean distance the better is the receiver sensitivity. The 2-dimensional minimum Euclidean distance on the other hand becomes more important in large order APSK based modulation formats. This is due to the fact that larger modulation formats tend to have larger symbol error ratios. Larger minimum Euclidean distance helps in lowering symbol error ratio which in turn improves the receiver sensitivity.

Using the combination of shaping consistent with the present disclosure and FEC encoding to probabilistically shape the constellation provides an extra degree of freedom to be able to overcome certain shortcomings of a given modulation format. For example, the probability of symbol detection error for the constellation point on the inner ring of the 64-APSK is much higher than the remaining 48 points. This is due to the much smaller Euclidean distance between constellation points in two dimensional domain. By using FEC codes and rules established by the nonlinear reversible code, it is possible to make certain points of a ring invalid, hence improve the Euclidean distance between constellation points in the ring without requiring higher average symbol power. This is done by increasing the probability of the points in the ring using the nonlinear reversible code consistent with the present disclosure.

Figure 6:
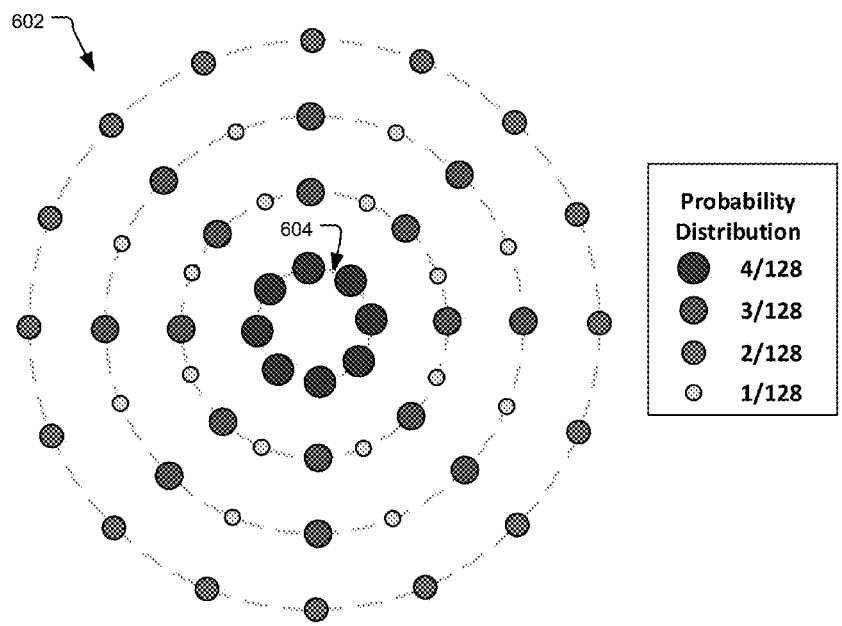
FIG. 6 is a constellation diagram illustrating a 64-APSK modulation format with eight constellation points in an inner ring consistent with the present disclosure.

FIG. 6, for example, is a constellation diagram 602 of a four dimensional 64-APSK signal shaped to increase the probability of the inner ring 604 using a nonlinear reversible code consistent with the present disclosure and to make 8 of the 16 points in the inner ring invalid using an FEC encoder applying an SPC code. As shown, the inner ring 604 of the constellation 602 has only 8 constellation points.

The constellation shown in FIG. 6 may be generated in an embodiment using a non-linear reversible code that receives nine input bits (i=9) and provides an encoded output including 12 output bits (i+c=12) grouped in two separate 64-APSK symbols with no additional bits provided to the mapper (i.e. n=0). With this configuration, each of the 512 input bit sequence possibilities are represented by a specific pair of 64-APSK symbols, with the inner ring of each of the symbols having only 8 constellation points. Table 2 shows the correspondence between the input bits to a nonlinear reversible code encoder 204 (FIG. 2) and the output bits of the nonlinear reversible code encoder 204 for the embodiment of FIG. 6. Table 2 also shows the 64-APSK symbol (Symbol 1) to which the first six bits of the output bits are mapped by the mapper 206 (FIG. 2) and the 64-APSK symbol (Symbol 2) to which the second six bits of the output bits are mapped by the mapper 206, where $r_i$ refers to the radii of the rings of the constellation (i∈ {1,2,3,4}). Since there are 512 input bit combinations in this embodiment, for brevity, Table 2 only includes a portion of the possible input bit sequences and the corresponding output bits.

TABLE 2

| Input bits | Output bits | Symbol1 | Symbol2 |
|---|---|---|---|
| 000000000 | 001100\|000001 | $r_1e^{j(2\pi/8)}$ | $r_2e^{j(0\pi/8)}$ |
| 000000001 | 001100\|000010 | $r_1e^{j(2\pi/8)}$ | $r_4e^{j(0\pi/8)}$ |
| 000000010 | 000001\|001100 | $r_2e^{j(0\pi/8)}$ | $r_1e^{j(2\pi/8)}$ |
| 000000011 | 001101\|000011 | $r_2e^{j(2\pi/8)}$ | $r_3e^{j(0\pi/8)}$ |
| 000000100 | 000010\|001100 | $r_4e^{j(0\pi/8)}$ | $r_1e^{j(2\pi/8)}$ |
| 000000101 | 000010\|001111 | $r_4e^{j(0\pi/8)}$ | $r_3e^{j(2\pi/8)}$ |
| 000000110 | 000011\|001101 | $r_3e^{j(0\pi/8)}$ | $r_2e^{j(2\pi/8)}$ |
| 000000111 | 001111\|000010 | $r_3e^{j(2\pi/8)}$ | $r_4e^{j(0\pi/8)}$ |
| 000001000 | 000000\|010001 | $r_1e^{j(0\pi/8)}$ | $r_2e^{j(7\pi/8)}$ |
| ... | ... | ... | ... |
| 111111010 | 111101\|111100 | $r_2e^{j(10\pi/8)}$ | $r_1e^{j(10\pi/8)}$ |
| 111111011 | 111101\|111111 | $r_2e^{j(10\pi/8)}$ | $r_3e^{j(10\pi/8)}$ |
| 111111100 | 111110\|111100 | $r_4e^{j(10\pi/8)}$ | $r_1e^{j(10\pi/8)}$ |
| 111111101 | 111110\|111111 | $r_4e^{j(10\pi/8)}$ | $r_3e^{j(10\pi/8)}$ |
| 111111110 | 111111\|111101 | $r_3e^{j(10\pi/8)}$ | $r_2e^{j(10\pi/8)}$ |
| 111111111 | 111111\|111110 | $r_3e^{j(10\pi/8)}$ | $r_4e^{j(10\pi/8)}$ |

Using Table 2, nine input bits generate specific associated 12-bit sequences that are mapped to two associated 64-APSK symbols with only 8 valid constellation points in the inner ring, as shown in FIG. 6. A variety of other configurations may be achieved using a nonlinear reversible code consistent with the present disclosure. Indeed, a system and method consistent with the present disclosure may be configured to map symbols to any specific constellation location, e.g. a constellation point or ring, or to any specific combination of constellation locations.

Figure 7:
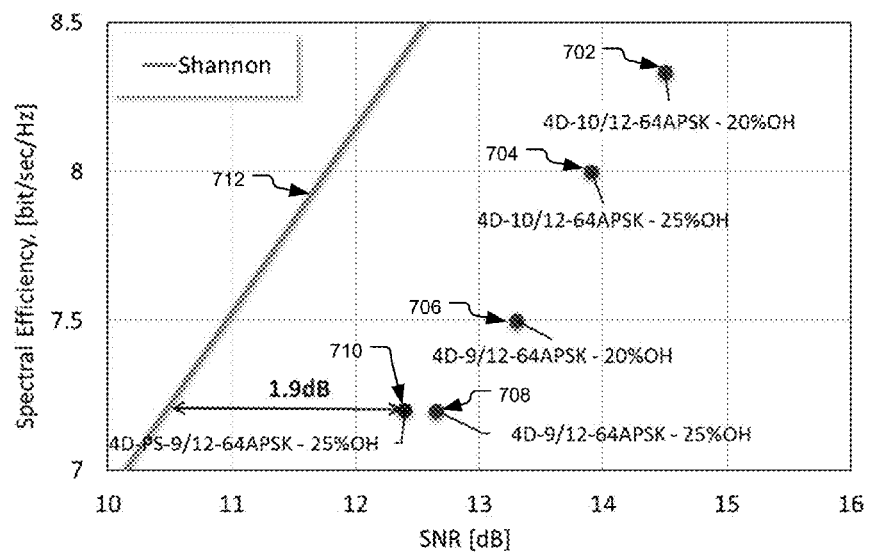
FIG. 7 is a plot of SNR vs. spectral efficiency illustrating performance of an exemplary system consistent with the present disclosure.

Probabilistic constellation shaping using a nonlinear reversible code consistent with the present disclosure improves receiver sensitivity compared to systems and methods without probabilistic constellation shaping. FIG. 7, for example, includes a plots 702, 704, 706 and 708 of SNR vs. spectral efficiency (bits/sec/Hz) associated with a systems without probabilistic constellation shaping, along with a plot 710 of SNR v. spectral efficiency associated with a system using probabilistic constellation shaping consistent with the present disclosure. FIG. 7 also includes a plot 712 illustrating the Shannon limit.

In particular, plots 702 and 704 show SNR vs. spectral efficiency for a system using a 4D-10/12-64APSK coded modulation (blocks of 2 64-APSK symbols with 10 information bits and 2 coding bits) with FEC codes having 20% (plot 702) and 25% (plot 704) overhead, respectively. Plots 706 and 708 show SNR vs. spectral efficiency for a system using a 4D-9/12-64APSK coded modulation (blocks of 2 64-ASPK symbols with 9 information bits and 3 coding bits) with FEC codes having 20% (plot 706) and 25% (plot 708) overhead, respectively. Plot 710 shows SNR vs. spectral efficiency for a system using a nonlinear reversible code for probabilistic shaping as shown and described in connection with FIG. 6 and Table 2 (i=9, i+c=12 and n=0) and FEC codes having a 25% overhead. As shown, plots 702, 704, 706 and 708 associated with systems using coded modulation without probabilistic shaping consistent with the present disclosure are generally equidistant from the Shannon limit plot 712, whereas plot 710 associated with a system consistent with the present disclosure using a nonlinear reversible code for probabilistic shaping combined with coded modulation has an SNR close to the Shannon limit plot 712, i.e. about 1.9 dB from the Shannon limit plot 712.

According to one aspect of the disclosure, there is provided a system comprising: a nonlinear reversible code encoder configured to receive a number, i, of information bits and apply a nonlinear reversible code to provide an associated encoded output in response to the i information bits, the encoded output comprising a number, i+c, of encoded bits; a mapper coupled to the nonlinear reversible code encoder and configured to receive the encoded output, the mapper being configured to map at least the i+c encoded bits to successive amplitude and phase-shift keying (APSK) symbols, each of the APSK symbols having an APSK modulation format with an associated constellation, the mapper being configured to map each of the symbols to an associated constellation location of the constellation in response to one or more associated ones of the i+c encoded bits; and a modulator coupled to the mapper and configured to modulate an optical signal in response to an output of the mapper to provide a modulated optical signal.

According to another aspect of the disclosure there is provided a system comprising: a nonlinear reversible code encoder configured to receive a number, i, of information bits, the nonlinear reversible code encoder comprising a lookup table for apply a nonlinear reversible code to provide an associated encoded output in response to the i information bits, the encoded output comprising a number, i+c, of encoded bits; a mapper coupled to the nonlinear reversible code encoder and configured to receive a second number, n, of information bits and the encoded output, the mapper being configured to map the n information bits and the i+c encoded bits to successive amplitude and phase-shift keying (APSK) symbols, each of the APSK symbols having an APSK modulation format with an associated circular constellation, the mapper configured to map each of the symbols to an associated ring of the constellation in response to one or more associated ones of the i+c encoded bits; and a modulator coupled to the mapper and configured to modulate an optical signal in response to an output of the mapper to provide a modulated optical signal.

According to another aspect of the disclosure there is provided a method comprising receiving a number, i, of information bits; applying a nonlinear reversible code to provide an associated encoded output in response to the i information bits, the encoded output comprising i+c encoded bits, and mapping at least the i+c encoded bits to successive amplitude and phase-shift keying (APSK) symbols, each of the APSK symbols having an APSK modulation format with an associated constellation, whereby each of the symbols are mapped to an associated constellation location of the constellation in response to one or more associated ones of the i+c encoded bits; and modulating an optical signal to provide a modulated output signal representative of the mapped output.

Embodiments of the methods described herein may be implemented using a processor and/or other programmable device. To that end, the methods described herein may be implemented on a tangible, computer readable storage medium having instructions stored thereon that when executed by one or more processors perform the methods. Thus, for example, the transmitter and/or receiver may include a storage medium (not shown) to store instructions (in, for example, firmware or software) to perform the operations described herein. The storage medium may include any type of non-transitory tangible medium, for example, any type of disk including floppy disks, optical disks, compact disk read-only memories (CD-ROMs), compact disk re-writable (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

It will be appreciated by those skilled in the art that any block diagrams herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. As used in any embodiment herein, a "circuit" or "circuitry" may comprise, for example, singly or in any combination, hardwired circuitry, programmable circuitry, state machine circuitry, and/or firmware that stores instructions executed by programmable circuitry. In at least one embodiment, the transmitter and receiver may comprise one or more integrated circuits. An "integrated circuit" may be a digital, analog or mixed-signal semiconductor device and/or microelectronic device, such as, for example, but not limited to, a semiconductor integrated circuit chip.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A system comprising:
   a nonlinear reversible code encoder configured to receive a number, i, of information bits and apply a nonlinear reversible code to provide an associated encoded output in response to the i information bits, the encoded output comprising a number, i+c, of encoded bits;
   a mapper coupled to the nonlinear reversible code encoder and configured to receive the encoded output, the mapper being configured to map at least the i+c encoded bits to successive amplitude and phase-shift keying (APSK) symbols, each of the APSK symbols having an APSK modulation format with an associated constellation, the mapper configured to map each of the symbols to an associated constellation location of the constellation in response to one or more associated ones of the i+c encoded bits; and
   a modulator coupled to the mapper and configured to modulate an optical signal in response to an output of the mapper to provide a modulated optical signal.

2. A system according to claim 1, wherein the nonlinear reversible code encoder comprises a lookup table for providing the encoded output in response to the i information bits.

3. A system according to claim 1, wherein the i+c encoded bits have a predetermined probability of having a digital zero value that is greater than a predetermined probability of the i+c encoded bits having a digital one value.

4. A system according to claim 1, wherein the APSK modulation format has a circular constellation.

5. A system according to claim 1, wherein the associated constellation location is an associated ring of the constellation.

6. A system according to claim 1, the system further comprising at least one forward error correction (FEC) encoder for encoding the i information bits with at least one FEC code.

7. A system according to claim 1, wherein the mapper is further configured to receive a second number, n, of information bits and the mapper is configured to map the n information bits and the i+c encoded bits to the successive APSK symbols.

8. A system according to claim 7, the system further comprising at least one forward error correction (FEC) encoder for encoding the i information bits and the n information bits with at least one FEC code.

9. A system comprising:
a nonlinear reversible code encoder configured to receive a number, i, of information bits, the nonlinear reversible code encoder comprising a lookup table for apply a nonlinear reversible code to provide an associated encoded output in response to the i information bits, the encoded output comprising a number, i+c, of encoded bits;
a mapper coupled to the nonlinear reversible code encoder and configured to receive a second number, n, of information bits and the encoded output, the mapper being configured to map the n information bits and the i+c encoded bits to successive amplitude and phase-shift keying (APSK) symbols, each of the APSK symbols having an APSK modulation format with an associated circular constellation, the mapper configured to map each of the symbols to an associated ring of the constellation in response to one or more associated ones of the i+c encoded bits; and
a modulator coupled to the mapper and configured to modulate an optical signal in response to an output of the mapper to provide a modulated optical signal.

10. A system according to claim 9, wherein the i+c encoded bits have a predetermined probability of having a digital zero value that is greater than a predetermined probability of the i+c encoded bits having a digital one value.

11. A system according to claim 9, the system further comprising at least one forward error correction (FEC) encoder for encoding the i information bits and the n information bits with at least one FEC code.

12. A method comprising:
receiving a number, i, of information bits;
applying a nonlinear reversible code to provide an associated encoded output in response to the i information bits, the encoded output comprising i+c encoded bits,
mapping at least the i+c encoded bits to successive amplitude and phase-shift keying (APSK) symbols, each of the APSK symbols having an APSK modulation format with an associated constellation, whereby each of the symbols are mapped to an associated constellation location of the constellation in response to one or more associated ones of the i+c encoded bits; and
modulating an optical signal to provide a modulated output signal representative of the mapped output.

13. A method according to claim 12, wherein the applying a nonlinear reversible code comprises using a lookup table for providing the encoded output in response to the i information bits.

14. A method according to claim 12, wherein the i+c encoded bits have a predetermined probability of having a digital zero value that is greater than a predetermined probability of the i+c encoded bits having a digital one value.

15. A method according to claim 12, wherein the APSK modulation format has a circular constellation.

16. A method according to claim 12, wherein the associated constellation location is an associated ring of the constellation.

17. A method according to claim 12, the method further comprising encoding the i information bits with at least one FEC code.

18. A method according to claim 12, wherein the method further comprising receiving a second number, n, of information bits and wherein the mapping comprises mapping the n information bits and the i+c encoded bits to the successive APSK symbols.

19. A method according to claim 18, the method further comprising encoding the i information bits and the n information bits with at least one FEC code.

* * * * *